United States Patent
Peruglia et al.

[11] 3,736,030
[45] May 29, 1973

[54] MOTOR VEHICLE HYDRAULIC BRAKING SYSTEMS

[75] Inventors: Marco Peruglia, Turin; Giancarlo Michellone, Cambiano, both of Italy

[73] Assignee: Fiat Societe per Axioni, Turin, Italy

[22] Filed: June 2, 1972

[21] Appl. No.: 259,312

[52] U.S. Cl. .................................. 303/6 C, 303/21 F
[51] Int. Cl. ............................................... B60t 13/18
[58] Field of Search ................... 303/6 C, 21 F, 84 A; 137/512.2, 512.3, 517, 100

[56] References Cited
UNITED STATES PATENTS

| | | | |
|---|---|---|---|
| 3,545,814 | 10/1970 | Margetts | 303/6 C |
| 3,637,963 | 1/1972 | Wellman | 303/6 C X |
| 3,674,954 | 7/1972 | Kish & Swanson | 303/6 C X |

*Primary Examiner*—Allen N. Knowles
*Assistant Examiner*—Gene A. Church
*Attorney*—Richard C. Sughrue, Gideon Franklin Rothwell, John H. Mion et al.

[57] ABSTRACT

An hydraulic braking system for motor vehicles comprising a loop circuit around which the hydraulic fluid is pumped when the engine is in operation, to maintain a normal operating pressure in the loop and two branches containing front and rear braking actuators. The brake pedal is linked to a valve in the circuit such that depression of the brake pedal causes a restriction in the loop circuit so as to increase the hydraulic pressure in the system to operate the brakes. The system thus has a normal operating pressure due to circulation of fluid in the loop part of the circuit, and a number of pressure sensitive devices are positioned in various parts of the circuit to detect a fall in the pressure in the part of the circuit with which each is associated and to isolate that part of the circuit from the remainder of the circuit when such a fall in pressure is detected. Thus, in the event of a failure of any part of the circuit at least some of the brakes will still be operable.

11 Claims, 2 Drawing Figures

MOTOR VEHICLE HYDRAULIC BRAKING SYSTEMS

OBJECTS OF THE INVENTION

It is one object of the invention to provide braking circuits which will operate to produce some degree of braking in almost any case of failure, whatever the nature of the failure and at whatever point in the circuit the member which has failed is located.

Another object of the invention is to provide a braking system of the servo-assisted type in which the servo-assistance is produced by the hydraulic braking fluid itself as well as by a fluid of a different nature circulating in a separate circuit as occurs, for example, in systems fitted with vacuum operated servo devices.

A further object of this invention is to provide a braking system in which the hydraulic fluid is subjected to a cooling action in order to promote correct functioning of the braking members even under unusual conditions of use.

SUMMARY OF THE INVENTION

According to the present invention, there is provided an hydraulic braking system for motor vehicles, characterized in that one part of the circuit is formed as a loop around which the hydraulic fluid can be circulated by a volumetric pump, the loop circuit including a reservoir and valve means operable, by a modulator member linked to the brake pedal, to restrict the flow of hydraulic fluid around the said loop circuit to increase the hydraulic pressure to operate braking actuators in respective branches of the system, there being provided at least one pressure sensitive valve responsive to a pressure drop in part of the system to isolate that part of the system so as to retain sufficient fluid pressure in the remainder of the system to operate the braking actuators therein.

Preferably the said valve means include a valve shutter slidable in a chamber, and resiliently biased by a spring against the action of which the shutter is movable by the said modulator member to operate as a piston to increase the pressure of the hydraulic fluid in the said chamber so as to operate any braking actuators connected thereto if the pump is out of action.

Various other features and advantages of the invention will become apparent during the course of the following description, with reference to the accompanying drawings, which is given purely by way of non-restrictive example.

DESCRIPTION OF THE PREFERRED EMBODIMENTS

Figure 1:
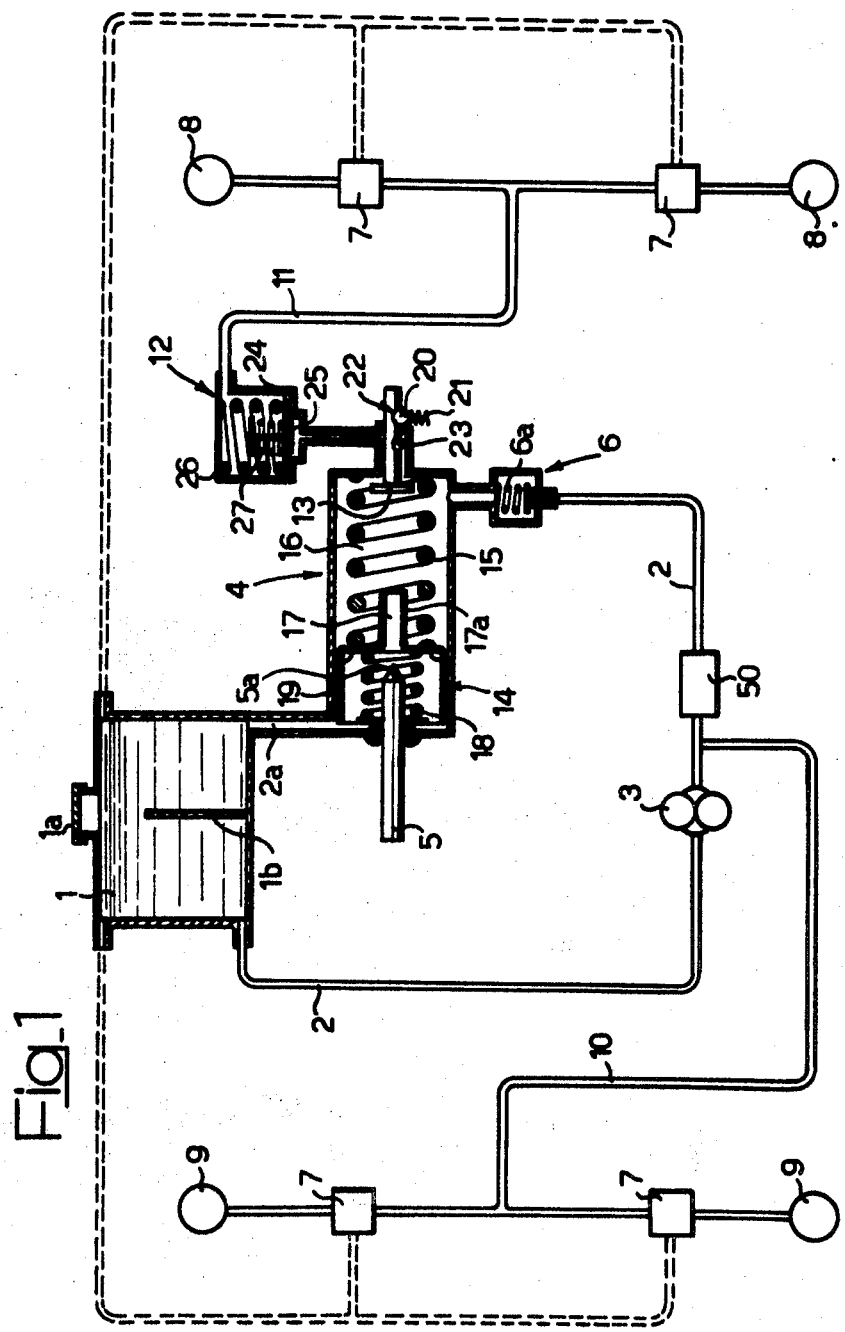
FIG. 1 is a schematic diagram of an hydraulic lay-out of a braking system constructed as a first embodiment of the invention having a single modulator and referred to below as a "simplex" arrangement.

Referring now to FIG. 1, there is shown a hydraulic fluid tank 1 having a filler opening sealed by a filler cap 1a, and a separator baffle 1b. A circulation pipe 2 including a volumetric pump 3 activated by the vehicle's engine (not shown) leads from the tank 1 via a pressure switch 50 to a valve device generally indicated 4. The valve device 4 is also connected to the tank 1 by means of a pipe 2a so as to define a continuous circulation circuit for the hydraulic fluid. In that branch of the circuit between the volumetric pump 3 and the valve device 4 there is in addition to the pressure switch 50, a one-way valve 6; the pressure switch 50 is operationally connected (by means not shown) to antiskid braking correctors 7 which are linked to the braking devices of each wheel, shown diagrammatically in the drawings and marked 8 for the front wheels and 9 for the rear wheels. Hydraulic fluid is fed to the rear wheel braking devices via the braking correctors 7 and a pipe 10 which leads from the pipe 2 between the volumetric pump 3 and the pressure switch 50; the front wheel braking devices are fed by means of a pipe 11 and the associated braking correctors 7, the pipe 11 being operatively connected to the valve device 4 via a pair of valves, 12 and 13 respectively the operation of which will be described below.

The valve device 4 comprises a cup shaped valve shutter 14 which is slidable in a chamber 16 to one end of which it is resiliently biased by a spring 15. The shutter 14 divides the chamber 16 into two compartments which communicate through an opening 17 formed in an axial extension 17a of the shutter 14. The opening 17 can be closed by a modulator member 5 which comprises a pin with one conical end 5a which can be inserted into the said opening 17 in order to restrict its outlet section; the modulator pin 5 has a fixed collar against which engages a spring 18 which extends between the collar of the pin and the bottom of the cup shaped valve shutter 14 to bias the modulator pin away from the opening 17.

The valve shutter is shaped so as to define, when it is in the position (illustrated in FIG. 1) to which it is biased by the spring 15 a port 19 between the chamber 16 and the pipe 2a communicating with the tank 1. At the end of the chamber 16 remote from the modulator 5 there is a valve 13 consisting of a shutter which is axially slidable between an open position (as shown in FIG. 1) and a closed position; both positions are delimited by snap stops made by engaging a ball catch 20 biased by a spring 21 with corresponding recesses 22 and 23 in the shaft of the shutter of the valve 13.

Movement of the valve shutter 13 from the open to the closed position is caused by engagement of the end 17a of the pipe 17 which extends from the valve shutter 14, when the valve shutter 14 is moved against the action of the spring 15 by the modulator pin 5.

The valve 12 which lies between the valve device 4 and the pipe 11 comprises two valve shutters, a main shutter 24 and a secondary shutter 25 which are movable in opposite directions against the actions of respective springs 26 and 27 which have different strengths, the spring 27 being much weaker than the spring 26.

The circuit described above operates as follows: The brake pedal is connected to the modulator 5 so that depression of the brake pedal causes displacement of the modulator 5 so that its conical end 5a, progressively closes the opening 17 thereby increasing the fluid pressure in the lines 2 and 11 due to the operation of the pump 3 thus starting the braking action of both the front and the rear wheels. The increase in hydraulic pressure is directly related to the restriction of the opening 17 by the modulator 5. Progressive closing of the opening 17 therefore induces a correspondingly progressive increase in the pressure of the hydraulic circuit in such a way that the pressure is, in fact, boosted. This boosting arises as follows:

As can be seen from the drawing, if the pressure of the fluid in the chamber 16 were caused by movement of the valve shutter 14 acting as a piston, then the pressure $P$ exerted by a force $t_2$ on the pedal of the brake if the working cross section of the shutter were $A_2$ would be given by:

$$t_2 = P \cdot A_2$$

On the other hand, with the arrangement described above in order to exert the pressure $P$ the force required on the brake pedal, where $A_1$ is the cross sectional area of the opening 17, is given by:

$$t_1 = P \cdot A_1$$

This is less than the force $t_2$ since $A_1$ is less than $A_2$.

For this purpose it is necessary that the strength of the spring 15 should be much greater than the strength of the spring 18 so that when the modulator 5 has completely closed the opening 17 the shutter of the valve 14 is held more or less immovable by the combination of the spring 15 and the hydraulic pressure in the chamber 16 against any force whatever exerted on the brake pedal.

If a failure occurs in the pump circuit, then the pressure switch 50 operates to cut out all the braking correctors 7. This is most important since if there is no recirculation of the hydraulic fluid to the tank the braking correctors would cause an excessive lowering of the oil level in the tank thereby robbing it of its safety braking function which will be described below.

In other cases of failure the circuit behaves as follows.

If the engine stalls, or the volumetric pump 3 fails or the rear wheel braking circuit ruptures to cause a loss of fluid and a decrease of pressure in the line 2 then, as mentioned above, all the braking correctors 7 are cut out by the pressure switch 50.

The lowering of pressure in the pipe 2 between the pump 3 and the valve device 4 causes the valve 6 to shut, isolating all that part of the hydraulic circuit containing the pump 3, the pressure switch 50, and the rear wheel brakes. The valve shutter 14 assumes the function of a piston and, urged by the modulator 5 under the action of the brake pedal moves against the biasing of the spring 15, to increase the pressure of the oil in the chamber 16. The oil pressure reaches the front wheel brakes via the valves 13 and 12 to effect braking thereby.

The reserve of oil necessary for the circuit to operate as described is assured by the presence of the baffle plate 1b in the tank 1. The valve 6, apart from the function described above, has the additional function of preventing the entry of air into the circuit in the case of failure of that branch of the circuit including the volumetric pump 3. With this object the valve shutter is biased to the closed position by a compressed spring 6a.

If the front wheel braking circuit fails in any way which causes a decrease in pressure therein this decrease in pressure is transmitted to the chamber 16 of the valve device 4. In this case the shutter of the valve 14 is thrust by the modulator 5 against the action of the spring 15 until the end 17a of the pipe 17 engages the shutter of the valve 13, which is then urged into the closed position in which it is retained by engagement of the ball catch 20 in the recess 23. The branch 11 of the front wheel braking circuit is thus completely closed. The rear wheel braking circuit continues to function normally with servo-assistance due to the circulation pressure produced by the pump 3. The rear wheel braking correctors 7 remain operative since the pressure switch 50 is cut in, and the reserve of hydraulic fluid is guaranteed by the baffle plate 1b in the tank 1.

If, the front circuit 11 fails at a time when braking is not taking place the reserve of fluid is preserved by the valve 12 since the spring 26 is sufficiently strong to prevent flow of fluid through the valve 12 to avoid circuit leakage. On the other hand the spring 27 is such as to allow free return of the fluid after whole circuit braking during normal operation.

Figure 2:
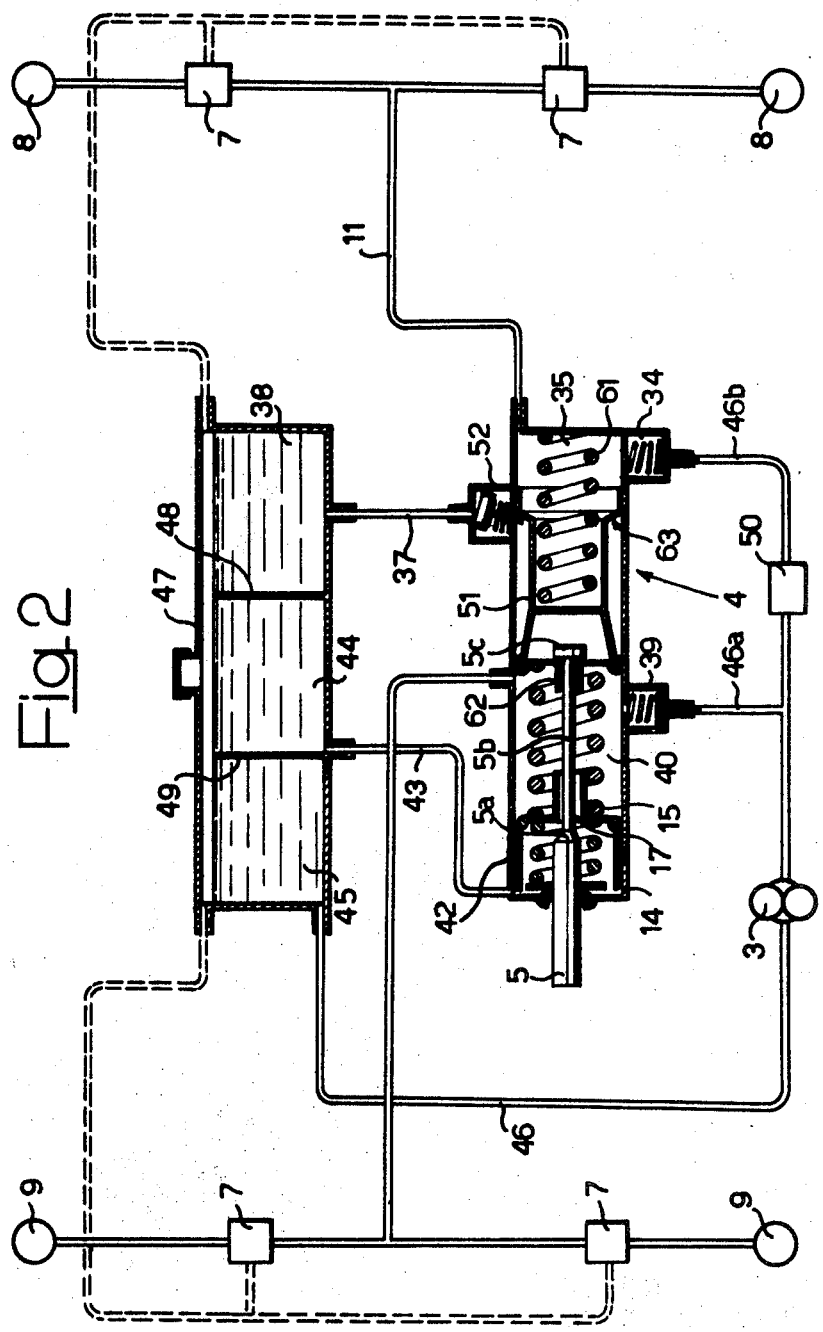
FIG. 2 is a similar schematic diagram of an hydraulic lay-out constructed as a second embodiment of the invention, having a double modulator and referred to as a "duplex" arrangement.

In FIG. 2 there is shown a second embodiment of the invention, which is formed as a system having a double circuit modulator or duplex circuit, and separate circuit branches for the front and the rear wheel respectively. The parts of the embodiment of FIG. 2 which correspond to integers of the embodiment of FIG. 1 will be referred to by the same reference numerals.

Referring now to FIG. 2 it will be seen that the circuit includes a reservoir 47 with two baffles 48 and 49 which divide the reservoir 47 into three compartments 38, 44 and 45. To the compartment 45 of the reservoir there is connected a pipe 46 which leads to a volumetric pump 3 driven by the engine (not shown) of the vehicle of which the braking system forms part. Downstream of the pump the pipe 46 branches into two parts 46a and 46b each of which is connected to respective non-return valves 39 and 34 and thence to a valve device 4. The valve device 4 comprises a cylinder in which there are two slidable valve shutters 14 and 51, respectively biased by springs 15 and 61.

The shutter 51 separates two chambers, 35 and 40 within the cylinder and has a port 62 through which the chambers 35 and 40 can communicate. The shutter 14 is similar to the shutter 14 described with reference to FIG. 1 and divides, in its turn, two chambers which communicate through a tubular port 17 of the shutter 14.

The chamber 35 is connected to the pipe 46b and also to the pipe 11 for feeding hydraulic fluid to the braking correctors 7 and thence to the brakes 8 of the front wheels. Additionally, the chamber 35 communicates with the compartment 38 of the reservoir 47 through a valve 52 and a pipe 37; the shutter of the valve 52 is operated by a cam ridge 63 in the shutter 51. Similarly the pipe 46a is connected to the chamber 40 to which is also connected the pipe 10 for feeding hydraulic fluid to the braking correctors 7 of the rear wheels and thence to the brakes 9; a pipe 43 leads from a port 42 to connect the chamber 40 with the compartment 44 of the reservoir.

The valve shutters 14 and 51 are both operated by the modulator member 5 which is formed as a pin having a first part terminating in a frusto-conical end 5a for controlling the port 17, an intermediate shaft 5b, and a terminal head 5c for controlling the communication port 62 between the two chambers 35 and 40. A pressure switch 50 which is operatively connected to the braking correctors 7 is located on the pipe 46 downstream of the pump 3.

The operation of the embodiment of FIG. 2 is as follows:

Under normal conditions, when the brake pedal, which is linked to the modulator member 5, is not depressed, the volumetric pump 3 causes the hydraulic fluid to circulate through both the front and rear hydraulic circulation circuits; the front circuit comprises the pressure switch 50, the non-return valve 34, the chamber 35, the valve 52 the pipe 37, and the compartment 38 of the reservoir 47, and the rear circuit comprises the pipe 46a, the non-return valve 39, the chamber 40 the ports 17 and 42, the pipe 43 and the compartment 44 of the reservoir 47.

As soon as pressure is exerted upon the brake pedal the modulator 5 is moved; this causes constriction of the port 17 and movement of the shutter 51 against the action of the spring 61 which causes closure of the shutter of the valve 52. The progressive closing of the port 17 induces a progressive increase of pressure in the circuit which is therefore modulated as described with reference to FIG. 1.

Rupture of that part of the hydraulic circuit which includes the pump induces a loss of servo-assistance and exclusion of the braking correctors 7 as described in relation to FIG. 1, but partial braking may occur for both the front and the rear braking circuits due to the action of the piston formed by the shutters 14 and 51 in a manner similar to that described with reference to FIG. 1; adequate oil reserve being ensured by the fact that the reservoir 47 is divided into separate compartments. In this case both valves 34 and 39 operate to isolate the part of the circuit containing the pump 3 from the remainder of the circuit.

Similarly, a rupture in either the front or rear braking circuit will cause loss of servo-assistance and cutting out of the braking correctors through the entire hydraulic circuit which will, nevertheless, be able to perform braking operation due to the aforesaid piston function of the corresponding shutter 14 or 51 and to the presence of the corresponding reserve tank which ensures a supply of the hydraulic fluid. For example, if the pressure in the front wheel braking circuit falls the pressure switch 50 will operate to cut out the braking correctors 7 and the pressure difference between the chambers 35 and 40 will cause the valve shutter 14 when moved by the modulator 5 to move the shutter 51 to a position where the valve 52 is closed. Following this further depression of the modulator 5 under the action of the brake pedal, causes the valve shutter 14 to act as a piston to operate the rear wheel brakes 9. On the other hand, a fall in the pressure of the rear wheel braking circuit will cause the shutter 14 to approach the shutter 51 when moved by the modulator 5 until the enlarged end 5c abuts the shutter 51 to form a mechanical connection so that the shutter 51 is moved as a piston by the modulator 5 to operate the front wheel brakes.

What is claimed is:

1. In a hydraulic braking system for motor vehicles, of the type comprising:
   reservoir means containing said hydraulic fluid,
   brake means associated with each wheel of the vehicle,
   circuit means connecting said brake means to said reservoir, and
   brake pedal means operable to increase the pressure in said circuit means to operate said brake means,
   the improvement wherein:
      said circuit means is formed as a loop part including said reservoir means and said brake pedal means, and at least first and second branch parts containing said brake means,
      pump means operative to circulate hydraulic fluid around said loop part of said circuit means, said brake pedal means operating, when said brake pedal is depressed, to restrict the flow of hydraulic fluid in said loop part of said circuit means to increase the hydraulic pressure in said system to operate said brake means, and
      pressure sensitive valve means in said system, said pressure sensitive valve means operating to isolate part of said circuit means when it detects a drop in pressure therein whereby sufficient hydraulic pressure is retained in the remainder of said circuit means to operate said brake means therein.

2. The hydraulic braking system of claim 1 wherein said brake pedal means includes a valve connected to a brake pedal, said valve comprising a first valve shutter slidable in a bore in the valve body,
   spring means biasing said first valve shutter in a first direction along said bore,
   said valve shutter being movable along said bore in a direction opposite said first direction if said pump means is out of action, to increase the pressure in said system to operate said brake means therein.

3. The hydraulic system of claim 2 wherein said first valve shutter is cup shaped and positioned in said bore in said valve body such as to separate said bore into two chambers,
   an opening in said valve shutter, said two chambers of said bore in said valve body communicating through said opening in said valve shutter,
   modulator means connected to said brake pedal means, said modulator means operating to control the size of said opening in said valve shutter in dependence on the position of said brake pedal means.

4. The hydraulic system of claim 3 wherein said first valve shutter is provided with an axial extension, said opening in said valve shutter being formed as a bore through said axial extension,
   a second valve shutter in said bore in said valve body, said second valve shutter controlling communication between said loop part of said circuit means and said first branch of said circuit means containing said brake means of said front wheels,
   said first valve shutter being movable against the action of said biasing spring means to move said second valve shutter to a closed position when the pressure in said first branch of said circuit falls.

5. The hydraulic system of claim 1 wherein there is a non-return valve means in said loop part of said circuit upstream of said brake pedal means, said non-return valve means operating to prevent any flow of hydraulic fluid in said loop part of the circuit in a direction opposite the normal circulation direction.

6. The hydraulic system of claim 1 including:
   further valve means between said brake pedal means and said first branch of said circuit, said further valve means having two valve shutters, spring biasing means biasing said two valve shutters in respective opposite directions, said further valve means operating to prevent a flow of hydraulic fluid to said first branch of said circuit in the event of a failure leading to a loss of pressure in said first branch, and to allow such flow under normal operating conditions.

7. The hydraulic system of claim 1 wherein said loop circuit means includes a pressure sensitive switch, braking correctors in said first and second branches of said circuit, means operatively connecting said pressure sensitive switch to said braking correctors, said pressure sensitive switch operating to prevent said braking correctors from operating when it detects a fall in pressure in said loop circuit.

8. The hydraulic system of claim 1 wherein said reservoir means includes at least one baffle plate means forming at least one reserve tank within said reservoir means, and means connecting said reserve tank directly to said brake pedal means.

9. The hydraulic system of claim 1 wherein said loop part of said circuit has two branches downstream from said pump means, respective non-return valve means separately connecting each said loop circuit branch to said brake pedal means, first and second valve shutters separately slidable in a common bore in the valve body of said brake pedal means, said first and second valve shutters respectively controlling the connection of said first and second branches of said circuit means to said first and second branches of said loop circuit means.

10. The hydraulic system of claim 9 wherein said first valve shutter separates said bore in said valve body into first and second chambers, an opening in said first valve shutter, said first and second chambers communicating through said opening in said first shutter and forming part of said first branch of said loop circuit, said second valve shutter separating said bore in said valve body into third and fourth chambers, an opening in said second valve shutter, said third and fourth chambers communicating through said opening in said second valve shutter and forming part of said second branch of said loop circuit.

11. The hydraulic system of claim 10 wherein said brake pedal means includes a modulator member operatively connecting said brake pedal and said first and second valve shutters, said modulator member comprising a first part having a frusto-conical face cooperating with said opening in said first valve shutter to control fluid flow therethrough and a second part having an enlarged end cooperating with said opening in said second valve shutter to control fluid flow therethrough.

* * * * *